United States Patent
Honig

(10) Patent No.: US 11,839,523 B2
(45) Date of Patent: Dec. 12, 2023

(54) DENTAL IMPLANT DEVICE AND SYSTEM

(71) Applicant: ABRACADABRA IMPLANTS LTD, Bat Yam (IL)

(72) Inventor: Iulian Honig, Bat Yam (IL)

(73) Assignee: ABRACADABRA IMPLANTS LTD, Bat Yam (IL)

( * ) Notice: Subject to any disclaimer, the term of this patent is extended or adjusted under 35 U.S.C. 154(b) by 0 days.

(21) Appl. No.: 17/285,135

(22) PCT Filed: Oct. 14, 2019

(86) PCT No.: PCT/IL2019/051118
§ 371 (c)(1),
(2) Date: Apr. 14, 2021

(87) PCT Pub. No.: WO2020/079684
PCT Pub. Date: Apr. 23, 2020

(65) Prior Publication Data
US 2021/0353391 A1  Nov. 18, 2021

(30) Foreign Application Priority Data

Oct. 14, 2018 (IL) .......................................... 262374

(51) Int. Cl.
*A61C 8/00* (2006.01)

(52) U.S. Cl.
CPC .......... *A61C 8/0048* (2013.01); *A61C 8/0059* (2013.01); *A61C 8/0062* (2013.01); *A61C 8/0074* (2013.01)

(58) Field of Classification Search
CPC ... A61C 8/0048; A61C 8/0059; A61C 8/0062; A61C 8/0074; A61C 8/0063; A61C 8/0077; A61C 8/0053
See application file for complete search history.

(56) References Cited

U.S. PATENT DOCUMENTS

| | | | |
|---|---|---|---|
| 5,071,345 A | 12/1991 | Rosen | |
| 5,209,666 A * | 5/1993 | Balfour | A61C 8/0018 433/173 |
| 5,417,570 A * | 5/1995 | Zuest | A61C 13/2656 433/172 |
| 5,480,304 A * | 1/1996 | Nardi | A61C 8/0048 433/172 |
| 9,668,833 B2 * | 6/2017 | Fischer | A61C 8/0062 |
| 2014/0162212 A1 * | 6/2014 | Mullaly | A61C 8/0054 433/173 |
| 2014/0170597 A1 | 6/2014 | Honig | |
| 2016/0213450 A1 | 7/2016 | Mangrane | |
| 2021/0220095 A1 * | 7/2021 | Fischler | A61C 8/008 |

FOREIGN PATENT DOCUMENTS

WO    2017/146478    8/2017

* cited by examiner

*Primary Examiner* — Heidi M Eide
(74) *Attorney, Agent, or Firm* — The Law Office of Joseph L. Felber

(57) ABSTRACT

A device and a system for forming a releasable connection between a dental implant abutment and prosthetic restoration, and in particular to such a device and system that is configured for use in situations where the inter-occlusal space is very limited, the device having a female connection device having a hollow tubular body featuring an open lumen.

13 Claims, 9 Drawing Sheets

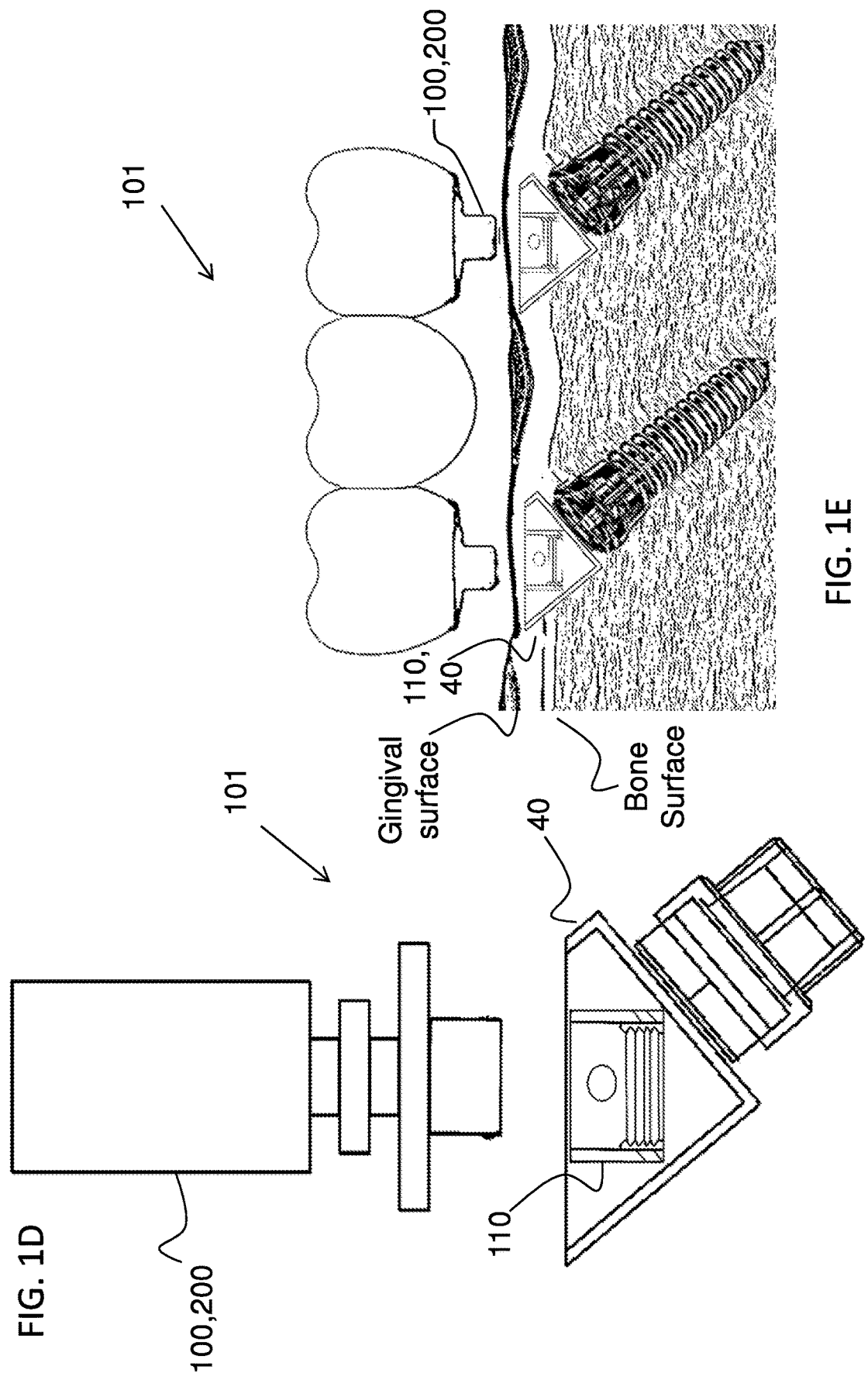

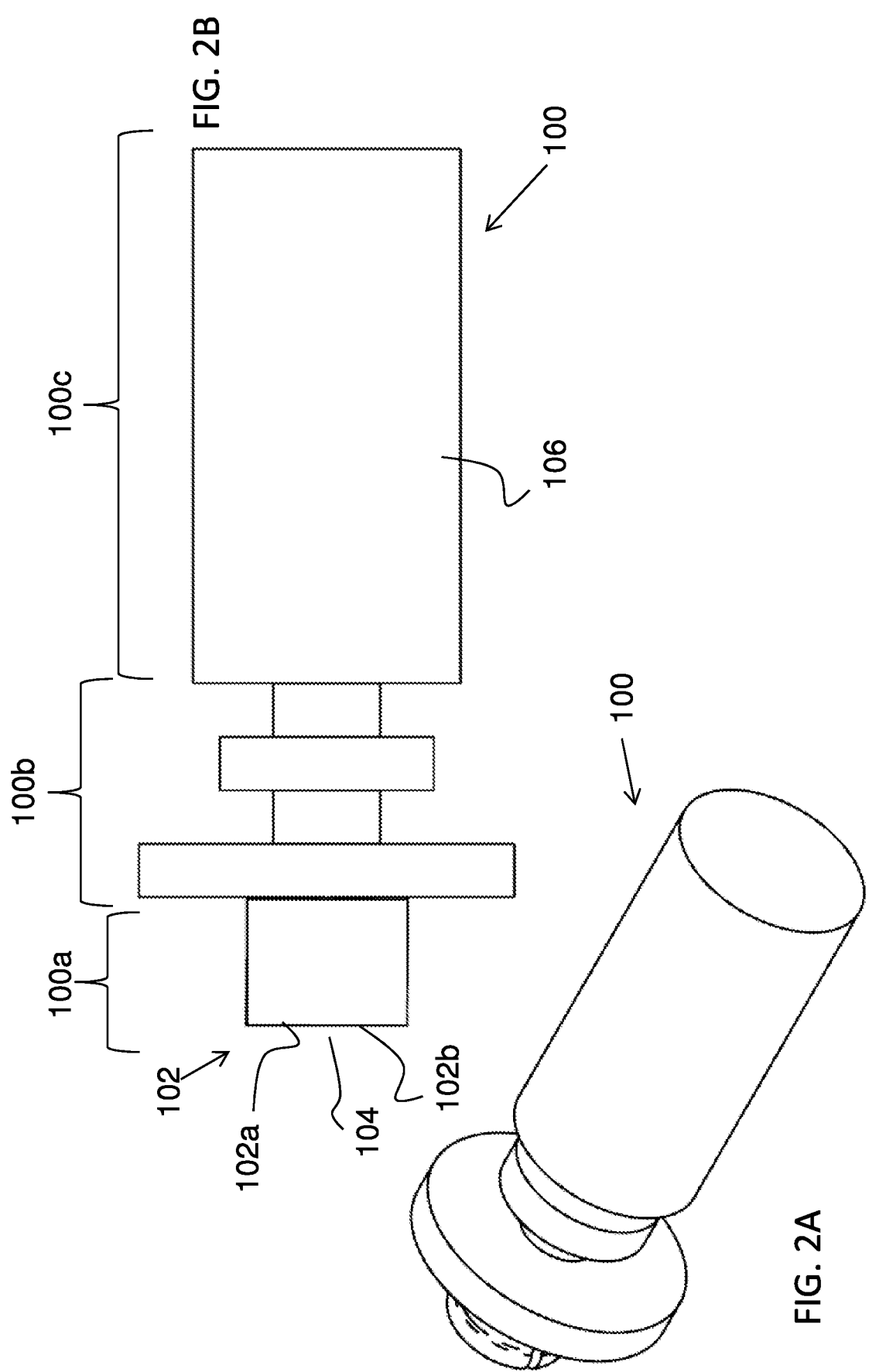

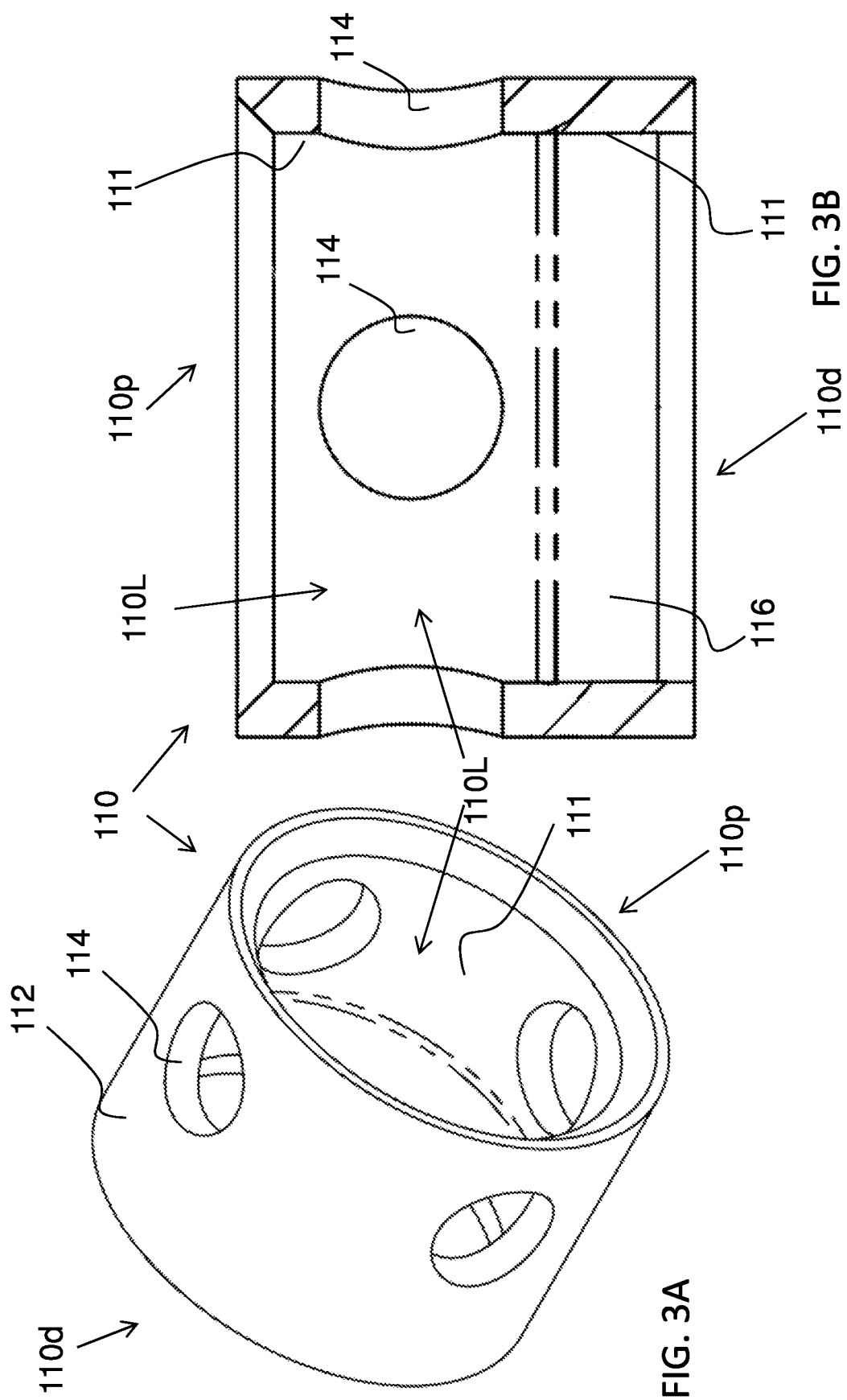

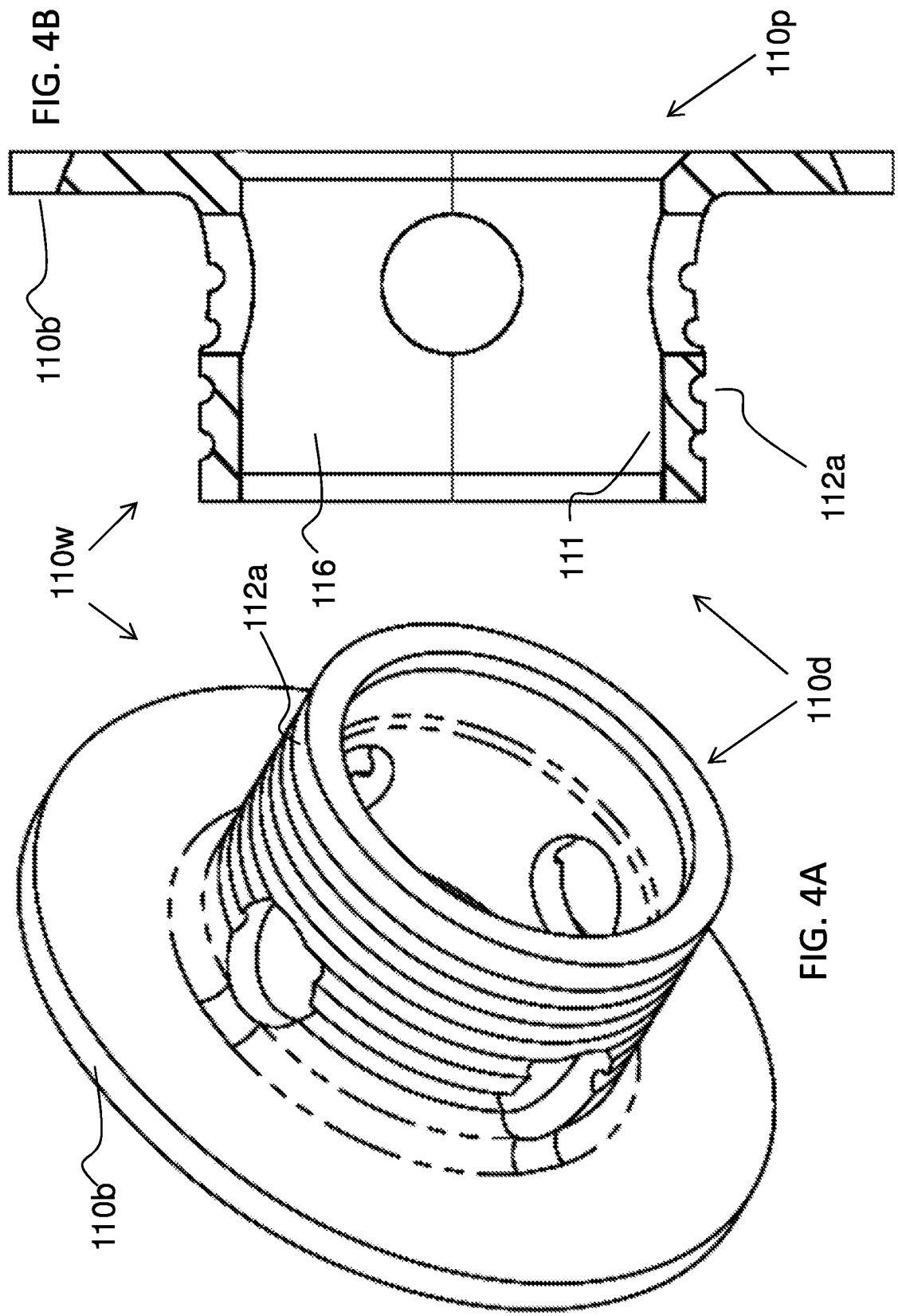

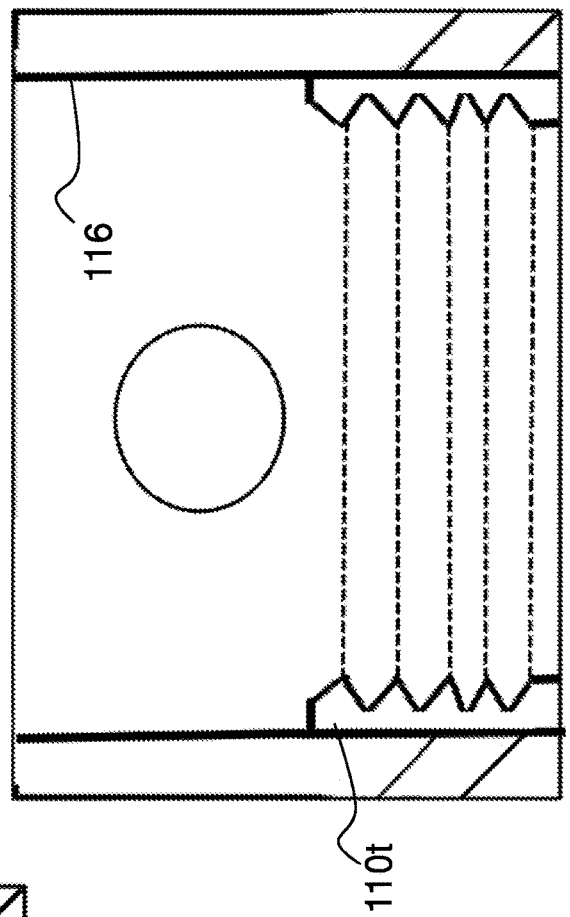
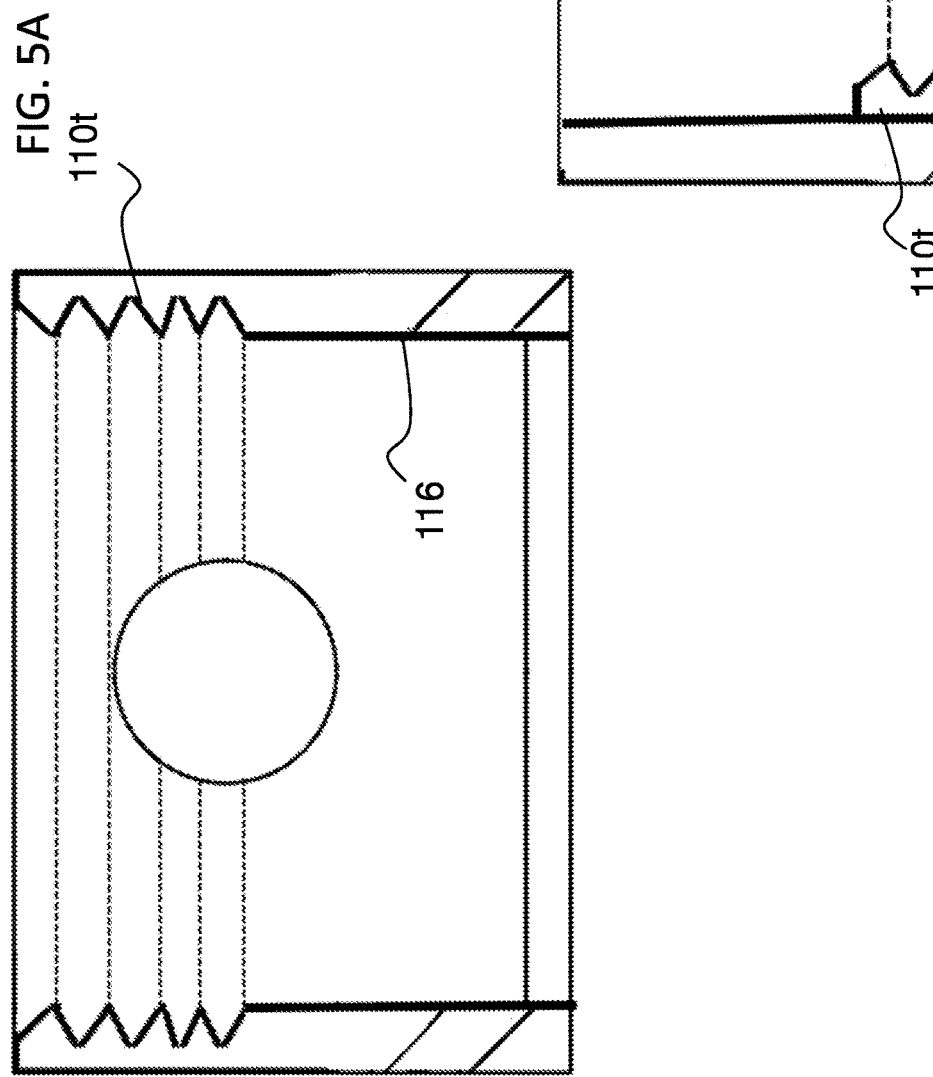

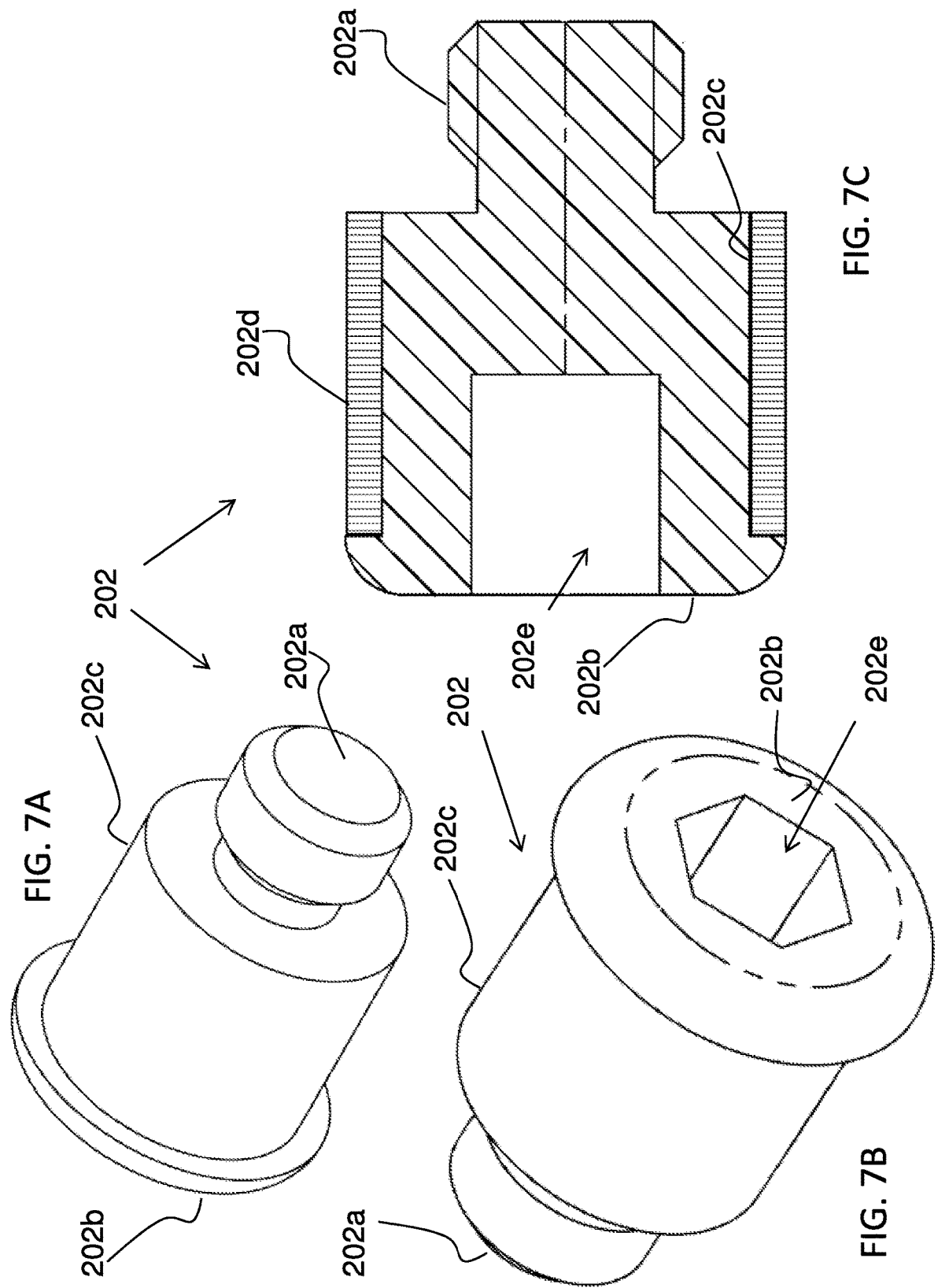

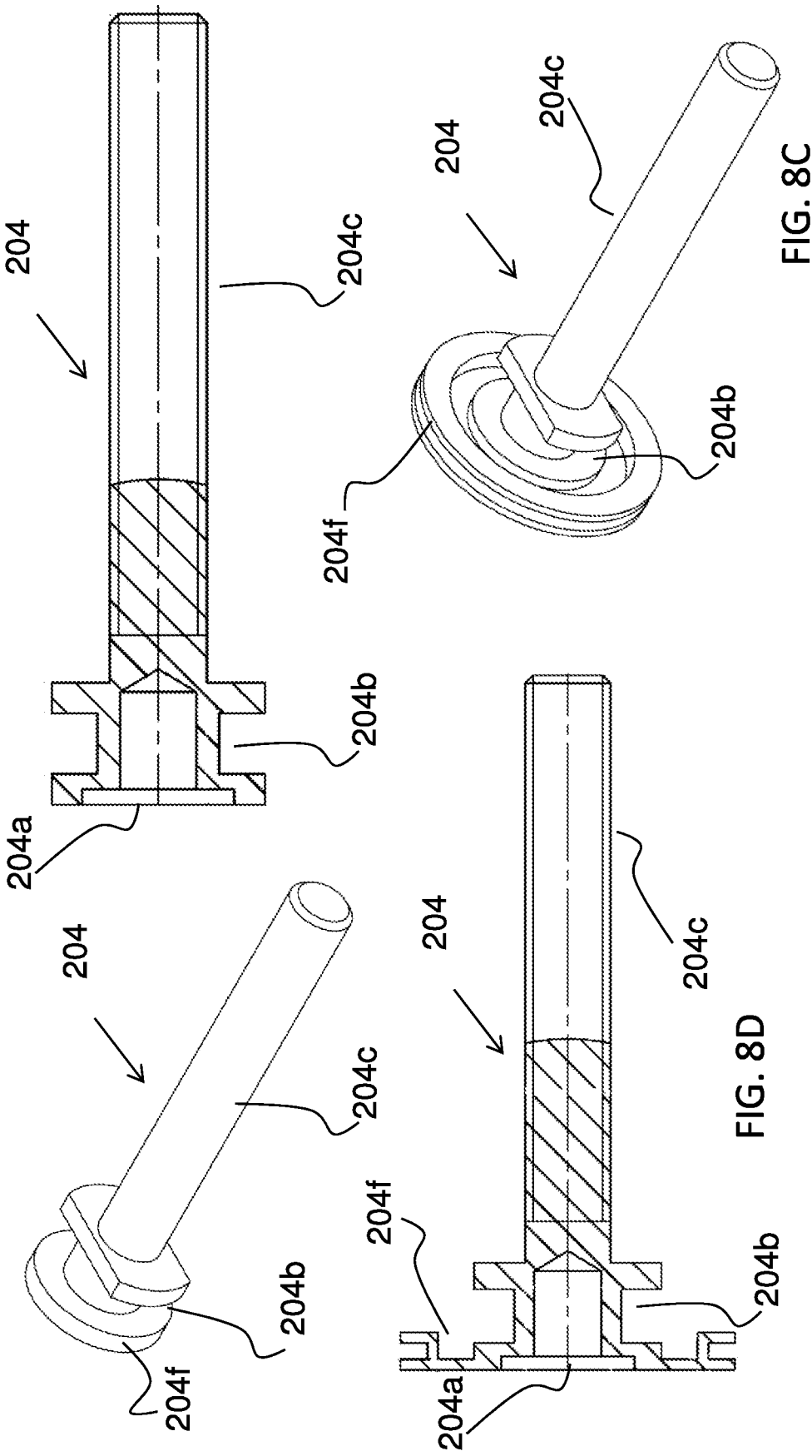

DENTAL IMPLANT DEVICE AND SYSTEM

FIELD OF THE INVENTION

The present invention relates to a dental implant device and system having a releasable connection between implant abutment and prosthetic restoration, and in particular to such a device and system that is configured for use in situations where the inter-occlusal space is very limited.

BACKGROUND OF THE INVENTION

Dental implants are well known in the art and typically include a dental implant anchor securely inserted into the patient's jawbone, an abutment member attached to the dental anchor, and a prosthodontic restoration (crown) is coupled thereon.

State of the art dental implant systems form a dental implant assembly includes the implant anchor, abutment, and crown (prosthetic restoration) that are placed and coupled in a stacked manner, one above the other, defining a dental implant height. The dental implant height is important for both determining the mechanical forces acting the implant while in use (chewing) and for the aesthetic aspects of the implant.

Proper allocation and transmission of the forces acting on the implant structures is important for the long term durability of the implant. Specifically the larger the implant height the higher the leveraging forces acting on the implant and the more likely it is to experience mechanical failure, for example cracking or breaking.

Similarly the implant height further affects the aesthetic properties of the implant. That is, an implant that is "too tall" or does not properly blend-in and/or seamlessly integrate with the natural teeth has an overall negative aesthetic effect.

Implant height becomes an even more pronounced problem both in terms of the aesthetic aspect and force profile for individuals that exhibit a limited (short) inter-occlusal space and/or a short dental cervical profile (or emergence profile).

State of the art dental implant assemblies and/or systems do not provide a means to control the implant height. This is primarily due to the fact that state of the art dental implant systems are manufactured with specific dimensions and angles. Accordingly most dental implant systems are manufactured according to specific prefabricated dimensions. Manufacturing limitations force manufactures to provide implant system with specific dimension and that cannot provide a solution for every clinical situation at hand. In particular present day dental implant devices and systems do not offer an adequate solution for individuals that have a limited and/or short inter-occlusal space.

US Patent Publication No. U.S. Pat. No. 9,968,425 to FAH et al, describes a female and male releasable connection that are configured to be fastened in a mouth to a dental prosthesis.

US Patent Publication U.S. Pat. No. 6,299,447B1 to ZUEST et al, describes a releasable dental attachment for engagement in a dental appliance. The retention and abutment members are designed for releasable snap engagement to secure the members together.

SUMMARY OF THE INVENTION

The dental implant device and system of the present invention overcome the limitation of the prior art by providing a dental device and system that is configured for controlling and reducing the "implant height". This is particularly useful for individual that have a limited (short) inter-occlusal space and/or a short dental cervical profile. That is where the space between corresponding upper tooth and lower tooth is below 5 mm and generally below 4 mm. Such limited inter-occlusal spacing generally requires rigid "screwed-in" restoration where the restoration and implant structures are rigidly affixed with one another. This rigid coupling not only limits the restoration to be a non-removable restoration it further leads to mechanical failures. One reason for such failure is the high leverage forces acting on the implant assembly and restoration.

Furthermore the releasable connection depicted by the prior art necessitate a male/female attachment that are disposed within the interocclusal space. Therein present day solutions necessarily increasing the leverage forces acting on the implant assembly and are therefore not available to individuals that present with a very-limited interocclusal space. Accordingly, currently available releasable connections do not provide a solution for individuals with a limited interocclusal space of below 5 mm and particularly for those individuals that present with 4 mm or less.

Embodiment of the present invention provide a dental implant device and system that is configured to provide a solution for individuals with limited (short) inter-occlusal space and/or individuals that have a short dental cervix. Embodiments of the present invention enable minimizing the implant height so as to minimize any torque and/or lever forces acting along the implant height and on the implant anchor. In embodiments, by minimizing the vertical distance between the crown and implant (dental height) reduces the fulcrum distance and the forces acting therebetween.

Within the context of this application the term "implant height" refers to the distance between the upper surface of the crown to the upper surface of the dental implant anchor.

Within the context of this application the term prosthodontic restoration, prosthesis, and/or restoration may refer to a crown, bridge, denture, or the like structure(s) alone or in combination that facilitate in holding, replacing, the visible portion of a prosthetic tooth.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

There are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations will not be discussed separately herein.

As used herein, the indefinite articles "a" and "an" mean "at least one" or "one or more" unless the context clearly dictates otherwise.

Herein the term "proximal" generally refers to the side or end of a device that is intended to be closer to the performing practitioner, further from the location of the intervention. The term "distal" generally refers to the side or end of a device that is intended to be closer to or at the location of the intervention, and therefore further away from the performing practitioner.

Importantly, this Summary may not be reflective of or correlate to the inventions protected by the claims in this or continuation/divisional applications hereof. Even where this Summary is reflective of or correlates to the inventions protected by the claims hereof, this Summary may not be exhaustive of the scope of the present inventions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 1D-E are schematic illustrative diagrams of a system according to embodiments of the present invention;

FIG. 2A-B are schematic illustrative diagrams of a dental prosthesis connecting device according to embodiments of the present invention;

FIG. 3A-B are schematic illustrative diagrams of a female connecting device for a dental implant device and system according to embodiments of the present invention; and FIG. 4A-B are schematic illustrative diagrams of a female connecting device for a dental implant device and system according to embodiments of the present invention; and FIG. 5A-B are schematic illustrative diagrams of a female connecting device for a dental implant device and system according to embodiments of the present invention.

FIG. 7A-C are schematic illustrative diagrams of a first portion of a dental prosthesis connecting device according to embodiments of the present invention; and FIG. 8A-D are schematic illustrative diagrams of a second portion of a dental prosthesis connecting device according to embodiments of the present invention.

DESCRIPTION OF THE PREFERRED EMBODIMENTS

The principles and operation of the present invention may be better understood with reference to the drawings and the accompanying description. The following figure reference labels are used throughout the description to refer to similarly functioning components are used throughout the specification hereinbelow.

40 interface member;
40a interface member apical end;
40b interface member occlusal end;
42 implant coupling portion/interface;
44 lumen;
46 proximal surface;
47 customizable rim portion;
100,200 dental prosthesis connecting device;
100a distal portion;
100b medial portion;
100c proximal portion;
102 male connecting interface; 106 crown coupling body;
110 female connection device (housing);
110b wide base;
110w wide housing;
111 internal surface;
112 external surface;
112a high surface area external surface
114 opening;
116 female connection/interface;
200 multi-piece prosthesis connection device;
202 first portion;
202a first portion proximal end;
202b first portion distal end;
202c first portion external surface;
202d first portion retention ring;
204 second portion;
204a second portion distal end;
204b second portion prosthesis coupling interface;
204c second portion proximal end;
204f second portion flange;

The present invention relates to a dental implant devices and in particular to a device and system that provides for minimizing the implant height and therefore the lever/torque forces acting on the dental implant anchor while providing a releasable connection between implant assembly and prosthesis.

Embodiment of the present invention further provide a dental implant that provides an esthetic solution for individuals having a short (limited) inter-occlusal space and/or individuals having a short dental cervix profile. Accordingly embodiments of the present invention overcome the problem of having an implant that is "too tall" and/or an incorrect emerging profile.

Embodiments of the present invention provide a dental implant device and system that interfaces with an implant abutment assembly described in co-owned PCT Publication No. WO2013/014643.

Figure 1A:
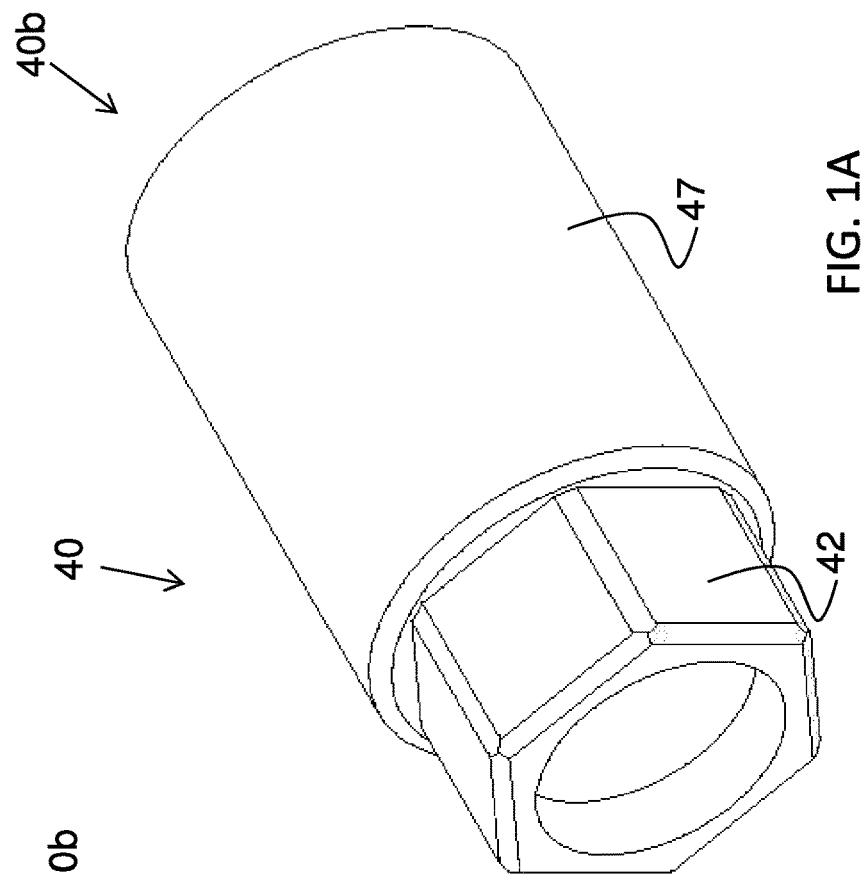
FIG. 1A-C are schematic illustrative diagrams of a dental implant device utilized for housing a female connecting device and for forming a system according to embodiments of the present invention.
Figure 1B:
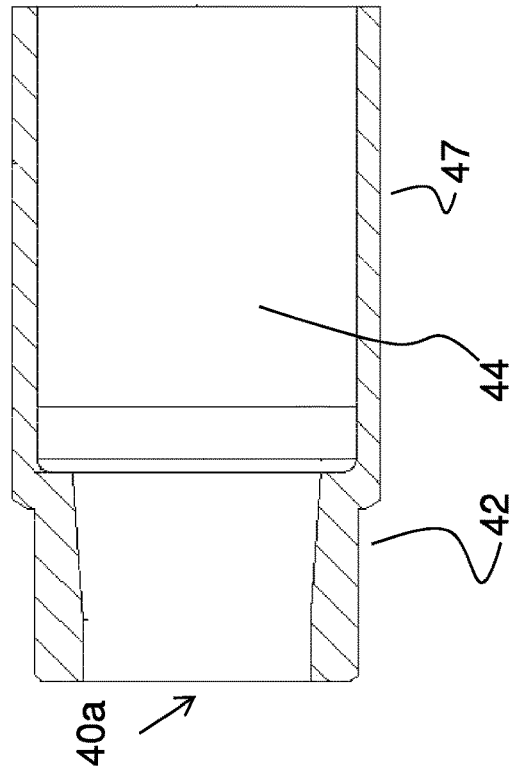
Figure 1C:
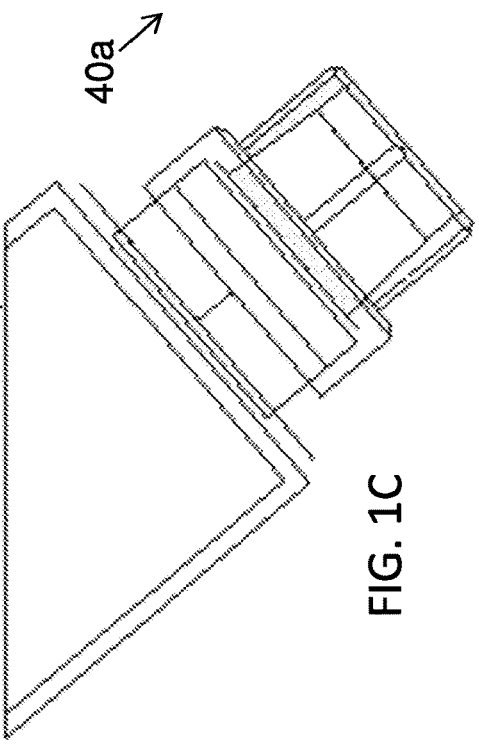

PCT Publication No. WO2013/014643 teaches an implant abutment assembly that includes an interface member 40, shown in FIG. 1A-C. The interface member 40 is coupled to a dental implant anchor along the implant's coupling platform (not shown) with a corresponding and/or matching interface 42, shown in the non-limiting form of a hexagonal anti-rotation interface.

FIG. 1A-B shows interface member 40 is a hollow tubular member featuring a non-customizable distal portion 42 and a customizable proximal portion 47 forming a lumen 44 defined along its length between the distal end 40a and the proximal end 40b. The distal portion defines a non-customizable dental implant anchor coupling interface 42 having a surface for matching and fitting with the implant anchor's connection platform. The proximal portion having an elevated rim 47 configured to be customizable so as to assume a shape, angle and vertical dimension according to an individual's gingival morphology 46. Once the proximal portion 47 is customized 46 the proximal portion further defines a trans-gingival collar, for example as shown in FIG. 1C.

FIG. 1C shows an illustrative schematic diagram showing a customized interface member 40, that has been adjusted along its occlusal portion and/or elevated rim 47 to form a flange 46 that is customized and/or individualized according to an individual's gingival morphology.

In embodiments of the present invention the interface member 40 is utilized to receive a female connection device 110, for example as shown in FIGS. 3-5 that in turn is capable of coupling with and receiving a couples with a corresponding prosthesis connecting device 100, 200, for example as shown in FIGS. 2A-B and FIGS. 6-8.

In embodiments the present invention provides a system 101, FIGS. 1D-1E, comprising interface member 40, FIGS. 1A-C, and a female connecting device (internal housing) 110, FIGS. 3-5. In some embodiments of the present invention system 101 may further comprise prosthesis coupling device 100, 200.

FIGS. 1D-E show an exemplary system 101 according to embodiments of the present invention. FIG. 1D shows an illustrative schematic diagram showing a customized interface member 40, that has been adjusted along its occlusal portion and/or elevated rim 47 to form a flange 46 that is customized and/or individualized according to an individual's gingival morphology that is fit and associated with a female connection device 110. As can be seen, female connection device 110, FIG. 3-5, is disposed internally with the customized interface member 40, and in particular within lumen 44. The proximal surfaces of both interface member 40 and female connection device 110 are aligned with one another. Such alignment is provided to minimize leverage forces so as to properly channel chewing forces.

Female connection device 110 is configured so as to receive and fit with prosthesis connection device 100,200 having a corresponding connection interface. Accordingly system 101 is configured so as to allow for minimizing lever force actin an implant assembly while preferably simultaneously providing a releasable connection that is configured for individuals presenting with a very limited interocclusal space and/or distance for example of up to 4 mm. Accordingly the coupling between female connecting interface device 110 and prosthesis connection interface 100 is provided within the lumen 44 of interface member 40.

FIG. 1E shows a similar schematic illustration of system 101 so as to show with the perspective of embodiment of the present invention interact with an implant anchor within host tissue such as bone and gingiva. As schematically illustrated an individualized interface member (40) is fit with female coupling interface device (110) and capable of receiving a dental prosthesis featuring prosthesis connecting device 100, according to embodiment of the present invention.

As schematically shown in FIG. 1E the interface member and female coupling device are deployed within the gingival tissue and do not, therein allowing for reduction of lever forces while providing a solution for a short interocclusal distance.

System 101 further allows two or more connection releasable connections as shown in FIG. 1E to be placed in parallel alignment with one another, irrespective of the implant anchors position with the bone. Such parallel alignment between individual implant, enabled due to the combination of interface member 40 and female connection interface 110, enables the formation of a releasable connection even in situations where there is a short interocclusal space and further provide for lowering the overall height of the implant assembly (crown to anchor) that in turn reduce the lever forces acting on the implant assembly. More over such parallel alignment allows for a friction fit between devices 110 and 100, 200, as they are telescopic with one another.

Female connection interface device 110 is preferably centralized with lumen 44 of interface member 40 so as to enable parallel alignment between additional adjacent implant assemblies on the same jaw.

Now referring to FIG. 3A-B that show schematic illustrative views of an optional embodiment of female connection device 110 according to the present invention.

FIG. 3A shows perspective view of female connection device 110 that is configured to fit within lumen 44 of interface member 40, as shown in FIGS. 1D-E. FIG. 3B show a sectional view of housing 110 revealing the female connection interface 116. Interface 116 is preferably configured to correspond and engageable with the connection interface provided in the prosthesis connection device 100. In embodiments interface 116 may be provided in optional forms for example including but not limited to a friction fit, snap fit configuration, or the like providing a secure releasable connection between devices 100 and 110. Most preferably interface 116 provides a non-fixed and/or releasable connection so as to allow for removal and/or disassociating of female connection device 100 and prosthesis connection device 110 with appropriate application of a disassociating force. In embodiments interface 116 may be configured such that the amount of force necessary for disassociating is configurable and controllable in the range between 0.5 Newton up to about 20 Newton.

Female connecting device 110 is a hollow tubular body featuring an open lumen 110L defined between a distal end 100d and a proximal end 100p. Preferably the tubular body forming device 110 features at least one opening 114 defined across external surface 112 and internal surface 111.

Device 110 may feature at least one opening 114 along external surface 112. In embodiment external surface 112 may feature a plurality of opening 114, for example as shown. Opening 114 provides for application of an adhesive or the like fixation material so as to allow retentive coupling of housing 110 within lumen 44 of interface member 40.

Preferably a biocompatible adhesive and/or dental cement may be applied along external surface 112 and allowed to affix and/or cure within lumen 44, wherein opening 114 may provide for accumulating any overspill of adhesive, and so as to increase the retentive surface area between lumen 44 and external surface 112. In embodiments adhesive and/or cement is applied after parallel alignment is achieved so as to correctly place and/or align device 110 within lumen 44.

In some embodiments, device 110 is oriented such that distal end 110d featuring female coupling interface 116 is preferably positioned along the distal portion of lumen 44 such that it is as distal as possible within lumen 44.

FIG. 4A-B show a schematic illustration of an optional embodiment of device 110 similar to that described in FIG. 3A-B, shown here in the form of a wide end female connection device 110w. Device 110w features a wide body flange 110b disposed at proximal end 110p.

FIG. 4A-B further depict an optional form of external surface 112 wherein surface 112 may be provided with a high surface area 112a that may optional feature a non-smooth surface having grooves and/or recess along surface 112a so as to increase its surface area and therefore increase retention with adhesive and/or cement within lumen 44, as previously described. Preferably grooves and/or recess disposed on non-smooth surface 112a is configured such that the retentive features do not traverse the external surface 112, 112a into the internal surface 111.

FIG. 5A-B show a further optional configuration of device 110 according to embodiments of the present invention wherein the internal surface 111 features threading 110*t* that may be disposed along a upper portion, as shown in FIG. 5A, or along a lower portion as shown in FIG. 5B. As shown, threading 110*t* is provided in combination with coupling interface 116, as previously described.

In embodiments length of device 110 may be from about 1 mm and up to about 10 mm (distal end to proximal end).

In embodiments the diameter of device 110 may be from 1 mm and up to about 6 mm.

In embodiments the diameter of flange 110*b* may be from about 2 mm and up to about 10 mm.

Now referring to FIG. 2A showing a perspective view of prosthesis connecting device 100 having a distal portion 100*a*, a medial portion 100*b*, and a proximal portion 100*c*. FIG. 2B shows a cross sectional side view of device 100. As shown, device 100 is a non-hollow device and is configured to be retentive (but not affixed) within the lumen 44 of interface member 40 with the female coupling device 110.

In embodiments, distal portion 100*a* features a male connecting interface 102 that is configured to correspond to its female connection interface 116 provided with device 110 as previously described. Male connection interface 102 may be provided in optional forms for example including but not limited to a friction fit, snap fit configuration, or the like providing a secure releasable connection between devices 100 and 110.

In embodiments interface 102 may be configured such that the amount of force necessary for disassociating it from interface 116 is configurable and controllable to be in the range between 0.5 Newton up to about 20 Newton.

In embodiments device 100 proximal portion 100*c* is optionally provided from a solid (non-hollow) cylindrical body 106. Preferably body 106 is utilized for alignment between adjacent devices 100 so as to place them in parallel alignment to ensure that all implants assemblies on the same jaw are parallel with one another.

In embodiments medial portion 100*b* of device 100 provides a retention connection platform for securely affixing device 100 with a prosthodontic restoration for example in the form of a crown (FIGS. 1D-E), bridge and/or denture. Medial portion 100*b* may further provide a shoulder for associating with a distal portion of bridge and/or crow and/or restoration. In optional embodiments an optionally an O-ring and/or like retentive device may be further associated along medial portion 100*b*.

Figure 6:
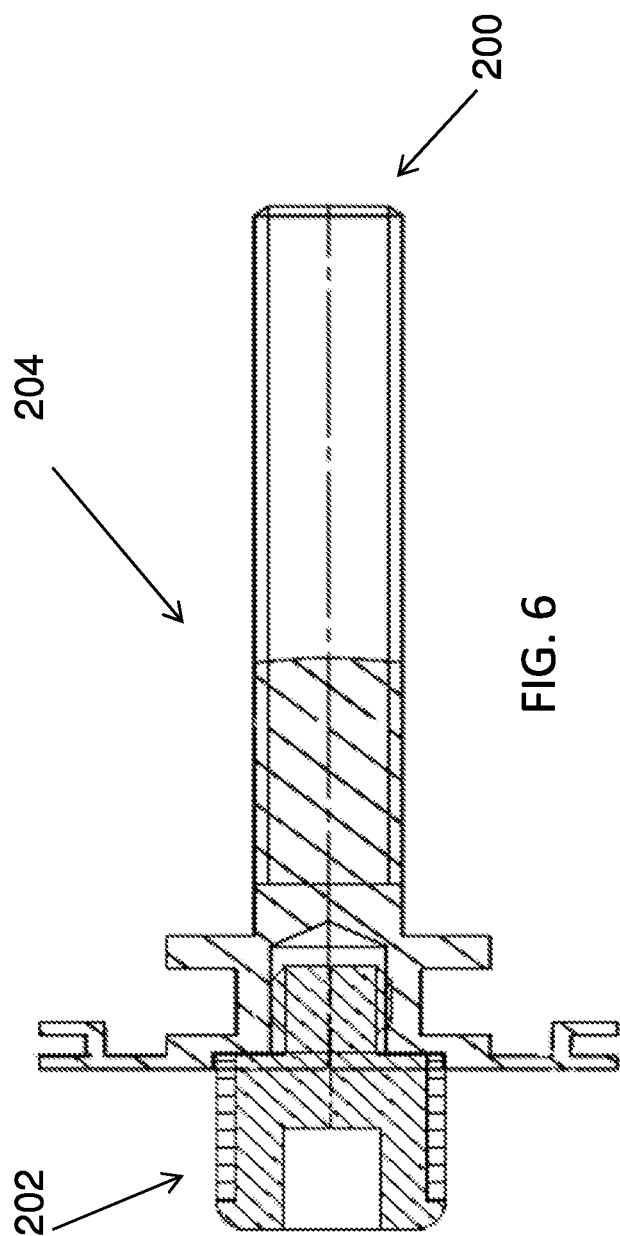
FIG. 6 is a schematic illustrative diagrams of a dental prosthesis connecting device according to embodiments of the present invention.

FIG. 2A-B show a single piece and/or unitary device 100, device 100 may be provided in a multi-piece form 200 provided from two portions 202, 204 for example as shown in FIG. 6-8. FIG. 6 shows devices 200 that functions in the same manner as device 100 previously described however it is composed from two separable portions, namely, a first portion 202 and a second portion 204 that may be coupled/decoupled with one another as shown in FIG. 6.

FIG. 6 shows multi-piece device 200 that includes a first portion 202, shown in FIG. 7A-C, that correspond to the distal portion 100*a* of device 100, FIGS. 2A-B, and a second portion 204, embodiments of which are shown in FIG. 8A-D, that corresponds to the combined medial portion 110*b* and proximal portion 110*c* of device 100 as previously described and shown in FIG. 2A-B.

FIG. 7A-C shows a schematic illustrative views of first portion 202 from different viewing positions. First portion 202 having a proximal end 202*a*, distal end 202*b*, external surface 202*c* configured to receive a retention ring 202*d*. Preferably distal end 202*b* features a tooling interface 202*e* that provides for handling and/or coupling or decoupling first portion 202 from second portion 204.

As shown in FIG. 6 proximal end 202*a* and at least a portion of ring 202*d* are configured to fit within a corresponding recess within second portion 204 so as to form device 200.

FIG. 8A-B show a first optional form of second portion 204 having a flange 204*f* configured to allow coupling to a prosthodontic device in the form of a bridge.

FIG. 8C-D show a second optional form of second portion 204 featuring a flange 204*f* that is configured to allow coupling to a prosthetic device in the form of a denture.

Preferably second portion comprises a distal end 204*a* configured to fit and couple with first portion 202, as shown in FIG. 6.

Preferably second portion comprises a coupling interface 204*b* provided for coupling to the prosthodontic element, for example including crown, bridge and/or denture.

preferably second portion 204*c* features a proximal end portion 204*c* that is provided to facilitate parallel alignment between adjacent implant assemblies, so as to allow device 100, 110 to be parallel with respect to adjacent implant assemblies by properly placing device 110 within lumen 44 of interface member 40.

While the invention has been described with respect to a limited number of embodiment, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

The foregoing is considered as illustrative only of the principles of the invention. Further, since numerous modifications and changes will readily occur to those skilled in the art, it is not described to limit the invention to the exact construction and operation shown and described and accordingly, all suitable modifications and equivalents may be resorted to, falling within the scope of the invention.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Citation or identification of any reference in this application shall not be construed as an admission that such reference is available as prior art to the invention.

Section headings are used herein to ease understanding of the specification and should not be construed as necessarily limiting.

While the invention has been described with respect to a limited number of embodiments, it will be appreciated that many variations, modifications and other applications of the invention may be made.

What is claimed is:

1. A dental restoration assembly system including at least two restoration assemblies that are in parallel alignment with one another irrespective of the implant anchors' position with the bone, wherein each restoration assembly comprises:

a) a connecting device having a hollow tubular body featuring an open lumen between a connecting device distal end and a connecting device proximal end; said tubular body featuring an external surface and an internal surface; said lumen featuring a female connection interface along the internal surface of said tubular body; and wherein said external surface features at least one configuration selected from:
i) a non-smooth surface providing a high surface area featuring grooves or recesses that do not traverse the external surface; and/or
ii) at least one opening disposed across said external surface and said internal surface; and wherein
b) an interface member featuring a non-customizable distal portion and a customizable proximal portion forming a lumen; the distal portion defining a dental implant anchor coupling interface; the proximal portion having an elevated rim that is configured according to a shape, angle and vertical dimension of an individual's gingival morphology; wherein the elevated rim defines a trans-gingival collar of said dental restoration assembly; and wherein said lumen is configured to have a cross section that is larger than a cross section of said connecting device, and said lumen is further configured to receive and be affixed with said connecting device with an adhesive and/or cement along said external surface and an inner surface of said lumen; such that when coupled with one another said female connection interface is disposed wholly within said lumen of said interface member and forms a gap between at least a portion of said external surface and the inner surface of said lumen; and
c) a prosthesis connecting device having a distal portion, a medial portion, and a proximal portion;
i) said proximal portion featuring a body configured for facilitating parallel alignment of said prosthesis connecting device relative to adjacent dental or prosthetic structures;
ii) said medial portion featuring a shoulder and a retention connection platform for securely affixing with a prosthodontic restoration in the form selected from a crown, bridge or denture;
iii) said distal portion featuring a male connecting interface corresponding to said female connection interface of said connecting device; such that when coupled along said female connection interface the prosthesis connecting device provides a releasable connection with said connecting device; and wherein the assembly is configured such that when coupled with one another the interface member, the connecting device, and the male connecting interface are disposed within gingival tissue, forming a telescopic connection with one another: and wherein each of said connecting device forming said system are in parallel alignment with one another.

2. The system of claim 1 wherein said female connection interface is provided adjacent to said distal end of said connecting device or said proximal end of said connecting device.

3. The system of claim 1 wherein said female connection interface is provided in the form of a friction fit recess.

4. The system of claim 1 wherein said female connection interface is provided in the form of a snap fit recess.

5. The system of claim 1 wherein at least a portion of said internal surface further comprises threading.

6. The system of claim 5 wherein said threading is provided adjacent to said distal end of said connection device or said proximal end of said connection device.

7. The system of claim 1 wherein said proximal end of said connecting device further comprises a wide base with respect to said distal end of said connecting device or said external surface of said connecting device therein providing a wide device configuration.

8. The system of claim 1 wherein said male connecting interface is provided in the form of a friction fit connection interface.

9. The system of claim 1 wherein said male connecting interface is provided in the form of a snap fit connection interface.

10. The system of claim 1 wherein said medial portion features a shoulder provided for interfacing with a distal portion of said restoration.

11. The system of claim 1 wherein said prosthesis connecting device is a unitary device.

12. The system of claim 1 wherein said prosthesis connecting device is a multi-piece device including a first portion corresponding to said distal portion and a second portion corresponding to said medial portion and said proximal portion wherein said first portion and said second portion may be coupled and/or decoupled from one another.

13. The system of claim 1 wherein when coupled with one another said proximal end of said interface member and said proximal portion of said connecting device are in alignment with one another.

* * * * *